United States Patent Office 3,495,973
Patented Feb. 17, 1970

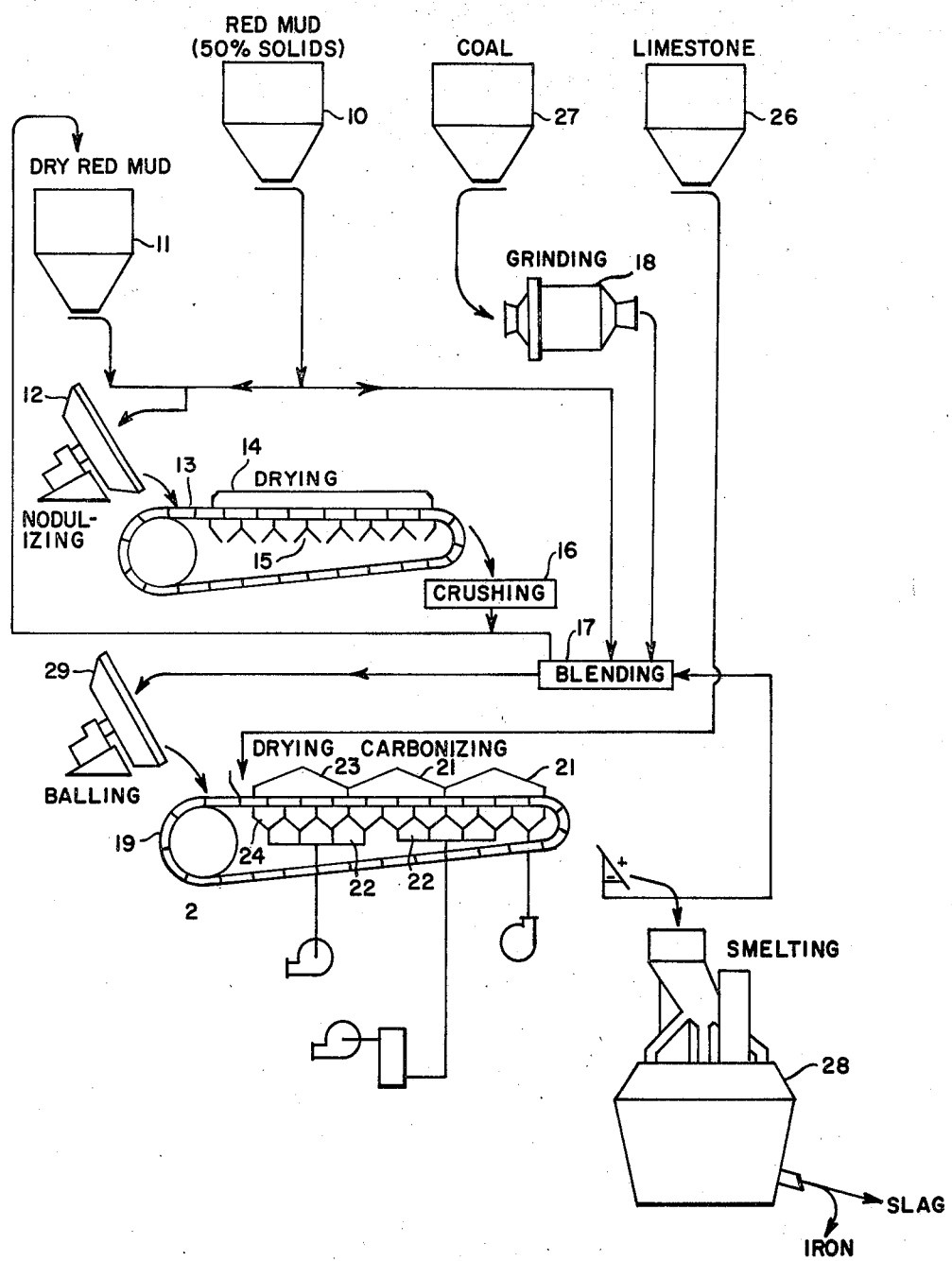

3,495,973
GAS-SOLID REACTION
Thomas E. Ban, Cleveland, and Harold E. Goetzman, Euclid, Ohio, assignors to McDowell-Wellman Engineering Company, a corporation of Ohio
Filed July 31, 1967, Ser. No. 657,170
Int. Cl. C22b 1/16
U.S. Cl. 75—5           9 Claims

ABSTRACT OF THE DISCLOSURE

There is provided a process for carrying out a gas-solid reaction between a circulating gas and a solid particulate burden supported on a traveling grate and including the step of passing hot gaseous medium transversely to the direction of movement of the solid particulate burden. The burden is composed of two layers, the first of which is a pelletized residue which results from the extraction of alumina from bauxite. Superimposed over the first praticulate layer is a second layer composed of a calcium carbonate-containing material. Hot gases are passed through the composite burden, those gases passing through the first layer having a temperature in the range of from 2000 to 2400° F. whereby gases are released from the superimposed layer into the stream of gases. The temperature of the incoming gases is adjusted to a point which is not below that sufficient to promote reaction between the gases and the materials in the first-mentioned layer. The gases then traverse the first-mentioned layer to effect a gas-solid reaction. An essential point of novelty is the formation of a conditioned gaseous medium, the composition of which is altered during its traverse through the composite burden whereby a desired gas-solid reaction is effected between the alumina-depleted bauxite and the gases dicharged by reason of passage of hot gases through a calcium carbonate containing layer.

BACKGROUND OF THE INVENTION

This invention relates to an improved process for carrying out gas-solid phase reactions, wherein the solid phase material is in the form of a solid particulate material deposited as a burden upon a traveling grate-type apparatus. In carrying out such a reaction, the gaseous medium is usually passed transversely to the direction of movement of the burden on the traveling grate so that the transversely traveling gaseous medium reacts or interacts physically with the burden. The nature of the gaseous medium, e.g. temperature, rate of flow, etc., is dictated by the nature of the gas-solid reaction sought. In certain instances, it has been found desirable to alter the nature of these incoming gases within the body of a burden on a traveling grate. Such conditioning can be carried out in a number of ways, and the present invention is concerned with a method of conditioning the gases for subsequent participation in a gas-solid phase reaction, by previously passing such gases through a different solid particulate material to effect a reaction which produces a conditioned gaseous medium.

It has been found that the gaseous medium conditioning in a gas-solid reaction, wherein the gas is a burden traversing gas and the solid is a solid particulate burden, can be effected by laminating or superimposing onto a first solid particulate burden, a layer of a second particulate material, both reacting or interacting favorably at separate and distinct predetermined temperature levels. Under the most favorable conditions the second particulate material is reacted with burden traversing gases at a temperature different from the reacting temperature for the first particulate burden, i.e., the lower layer next adjacent the grates, which provides a temperature differential and results in the formation of a gaseous by-product which is released into the hot gas stream traversing the layers of material. Thus, a new or conditioned gaseous medium having a different chemical and/or physical properties is created which by the process of this invention effects the desired gas-solid reaction in the first layer of particulate material.

For example, this invention has found particular utility in recovery of iron values from alumina-depleted bauxite and will be illustrated in reference thereto. Bauxite is a principal ore of aluminum. Bauxite contains trihydrates, monohydrates and typically about 60 weight percent alumina. Methods for refining bauxite to obtain the alumina generally take advantage of the solubility equilibria of the alumina hydrates in a caustic soda solution.

One process, universally used today, for refining bauxite is the Bayer process. By this process bauxite, as mined, is finely ground and charged to digesters with a hot caustic soda solution to put the aluminum in solution as sodium aluminate. After digestion, the caustic and soluble sodium aluminate are separated by settling and filtration from insoluble residue. The residue is "red mut," about 3 tons of which are formed for each ton of aluminum product. The mud appears as fine particles (less than a micron size. The "red mud," depleted of alumina, ordinarily imposes severe disposal problems inasmuch as the caustic content is detrimental to plant and animal life. Also large unsightly ponds are needed as settling ponds for storage of the waste material.

"Red mud" generally comprises minor amounts of oxides of aluminum, iron, silicon, titanium, calcium and sodium. Attempts have been made to utilize the "red mud," generally without much success.

This invention, therefore, is illustrated specifically with reference to the conditioning of the gases and recovery of iron values from alumina-depleted bauxite. Prior art iron making methods contemplate an improved system for producing carbonized and prereduced iron ore pellets. In the prior art the iron ore, which is rich in iron, is mixed with a solid carbonaceous material and submitted to a gas-solid reaction in the presence of realtively hot gases on a traveling grate. The hot gases are passed transversely to the direction of movement of the traveling grate and effect a reduction of the iron ore by action with the carbon contained therein to produce a pellet which contains free metallic iron, carbon, and desirably a fluxing material. However, this procedure has not been and cannot, without modification, be advantageously adapted to ores such as "red mud" of low iron content. With the low grade ores as provided by "red mud," it is not easy to effect the desired gas-solid phase reaction because of the presence of large quantities of the required basic flux material and gangue forming materials.

DESCRIPTION OF THE INVENTION

It has been found unexpectedly that iron values can be extracted from "red mud" by superimposing upon a first layer of pellets formed from the "red mud" and a solid carbonaceous material, a layer of gas releasing material, such as for example, limestone or oyster shells. When this is done, and gases at elevated temperatures passed through the gas releasing material, prior to contacting the layer of pellets derived from the "red mud," the gaseous medium is conditioned both with respect to its temperatures, and its chemical composition, so as to be suitable for favorable reaction with the "red mud" derived pellets to form a carbonized product suitable for use in the recovery of iron values therefrom, as well as providing a fluxing material capable of carrying into slag the impurities which are undesirable and also contained within the "red mud."

Thus, not only are the gases conditioned for use in contacting the pelletized "red mud," but there is simultaneously produced as a byproduct of the conditioning operation, a slag forming material which is useful in combination with the carbonized pellets for introduction into a smelting apparatus.

Generally stated, then, the present invention resides in a process for carrying out on a traveling grate, a gas-solid reaction between a burden traversing gas and solid particulate burden at a predetermined elevated temperature, including the steps of passing hot gases transversely to the direction of movement of the solid particulate material burden on the traveling grate and including the specific steps of:

(a) Providing a first solid particulate layer;

(b) Superimposing on said first solid particulate burden, a layer of a second solid particulate material, the second solid particulate material being reactive with hot, incoming gases to yield a conditioned gas, e.g., carbon dioxide enriched gas at a reaction temperature different from the reaction temperature of the first solid particulate material.

(c) Contacting the layer of material with highest gas-solid reacting temperature with hot, incoming oxidizing gases at the reaction temperature of the material having the highest gas-solid reacting temperature. The reaction temperature differential and strategic placing of the second particulate material allows the release of a conditioning gas from the material at the highest reaction temperature.

A specific example is a $CaCO_3$-containing material. Thus, the hot burden-traversing gases are diluted with the conditioning gas so released, and in the case of calcium carbonate, the gas released is carbon dioxide and requires heat from the incoming gases to bring about the decomposition of the carbonate.

(d) Passing the $CO_2$-diluted gaseous medium through the burden composite to effect a gas-solid reaction.

(e) Simultaneously, adjusting the temperature of the hot, incoming gases not below that sufficient to sustain favorable reaction between the conditioned gases and the first layer of material.

The conditioning gases, including a carbon oxide, e.g., carbon dioxide released by the carbonate-containing material contacts the first layer of particulate material, including, for example, coal, and provides a protective, less oxidizing heat transfer medium to promote reaction between the coal and the iron oxide of the pellets; in other words, the carbon oxide diluting the incoming gases is an important phase of the gas-solid reaction by rendering the gases less oxidizing and thus promoting under the heat conditions a reaction between the coal and the iron oxide in a relatively lower oxidizing environment.

More particularly, the "red mud" is available in a disposal pond has about 50 percent solids. This liquid material is fed with dried "red mud" to a balling apparatus whereby nodules of "red mud" are formed about the size of rice up to ¼" in average diameter. The nodules of "red mud" are dried by any suitable means such as a traveling grate drier. The dried product is shredded, crushed and mixed with solid carbonaceous material, such as for example, coal. The resulting mixture is then pelletized. These pellets are then deposited upon a traveling grate. Superimposed upon the pellets is, according to one embodiment, a calcium carbonate-containing material.

Instead of calcium carbonate, oil-bearing material such as oil shale, coal, lignite or the like, may be used as the gas conditioning material to impart hydrocarbon content, carbon monoxide or other components to the gas to alter its physical and/or chemical properties.

Returning to the illustrative case, the composite burden is thereupon carbonized by subjecting it to hot, incoming gases. Preheated gases are passed downward through the burden composite a very high temperature. The high temperature, for example, is about 2200° F., causes cal-solid carbonaceous material, a layer o fgas releasing material while the lower layers of pellets are carbonized by diluted and cooled gases at lower temperatures. The resulting pellets, containing a substantial percentage of iron in a reduced state, are ready to be introduced into a smelting furnace.

Referring more particularly to the drawing, there is shown a simplified flow sheet of the present invention. "Red mud" of a type contemplated for use in the process of the present invention has approximately the following composition:

Percent (dry basis):                                      Red mud
$Al_2O_3$ ------------------------------------ 22.0
$Fe_2O_3$ ------------------------------------ 46.8
$SiO_2$ -------------------------------------- 5.0
$TiO_2$ -------------------------------------- 6.1
CaO ---------------------------------------- 4.9
$Na_2O$ -------------------------------------- 2.8
L.O.I. -------------------------------------- 11.0

Red mud of such a composition as above described and containing about 50% moisture is retained in reservoir 10 before being combined with approximately equal amounts of dried "red mud" of about 98 weight percent solids from reservoir 11. The ingredients are throughly blended and are sent to a nodulizing or pelletizing apparatus 12 of the rotating inclined pan or drum type. The particular material from 11 and the slurry from 10 after nodulizing or balling takes on the form of nodules or various small sizes. Reference is made to U.S. Patent No. 2,947,026, which illustrates one form of pelletizing apparatus useful in forming either pellets or nodules. The nodules generally range in size from about ⅜" to 1/16".

The green nodules (nodules which have not been dried) are deposited about 5–10 inches deep on a traveling grate apparatus 13 for drying. As is well known to those skilled in the art, the traveling grate is an elongated trackway having supported thereon a plurality of individual traveling pallets each having a bottom formed of a plurality of grate bars and upstanding side walls. When the traveling grate members are progressing along a level portion of the trackway, they form a continuous channel. At the discharge extremity of the grate, the individual pallets are carried by a terminal guide member in an inverted position and returned in an inverted position to the opposite or charging extremity of the trackway where they are again inverted to an upright position to repeat the cycle. The trackway is provided with a hood portion 14 for the admission (not shown) or removal of gaseous medium. In coacting relation beneath the pallets and the burden are a plurality of contiguous windboxes 15 adapted for the admission of gaseous material to or withdrawal of gaseous medium through the material on the grate. The gases traversing the material on the grate can be spent gases from another portion of the process and enter a drying chamber at a temperature in the range of about 400° F.–1000° F. at a flow rate of about 250 s.c.f.m./ft.² (standard cubic feet per minute per square feet of grate area). Because spent gases are often at temperatures too high for proper drying, these gases can be diluted with ambient air so that the temperature of the drying gases contacting the nodule burden is within the desired range. The nodule burden on the grate is subjected to the drying phase for about 12–14 minutes and are reduced in weight by about 25 weight percent due primarily to water loss.

Following the drying phase, the nodules enter conventional crushing apparatus 16 where the nodules are shredded and reduced in size. The shredding operation produces a pulverized product of the approximate original size of "red mud."

It is preferred to recycle a portion of the dry pulverized material to reservoir 11, e.g. about half, for subsequent blending with red mud slurry for the nodulizing and drying operation.

After crushing, the product enters a blending zone 17 where it is mixed with the metallurgically required amounts of ground, solid carbonaceous material, such as for example, coal from reservoir 27 ground at 18, and significant amounts of liquid "red mud" from the reservoir 10 and returns from the smelting operation 28. The additional liquid "red mud" is added to provide the moisture for subsequent balling or pelletizing. Carbonaceous material is added to provide a reducing agent for the pellets. The blend of "red mud" and coal is conveyed to a balling apparatus 29 where it is pelletized. The green pellets, containing moisture to the extent of about 17–19 percent by weight and of a size of about ¼–1 inch in diameter, pass from the balling apparatus onto traveling grate 19 where they form a layer about 5 to 10 inches deep. A layer of oyster shells (calcium carbonate) is superimposed over the pellet burden. This burden is first submitted to a drying phase defined by hood 23 coacting with windboxes 24 by means of which gases heated to 400–600° F. traverse the burden for about 12–14 minutes at a flow rate of 250 s.c.f.m./ft.$^2$. These gases also can be spent gases from another portion of the process. The temperature of the drying gases is adjusted so that pre-ignition of carbonaceous matter is avoided, and spalling of the balls is minimized. Spalling causes the formation of undesirable quantities of "fines." The calcium carbonate layer is imposed on the pellet layer to a depth of about 1 to 4 inches. The grate loaded with the composite burden then passes into a carbonizing and reducing zone defined by hoods 21 and windboxes 22 where the burden is contacted with a hot downwardly directed draft. The hot draft is directed downwardly through the burden at a rate of about 100 to 222 s.c.f.m./ft.$^2$ at a temperature of about 2000–2400° F. or at a temperature sufficient to cause rapid reaction between $CaCO_3$-containing material and the incoming hot gases. This hot draft causes calcination of the calcium carbonate-containing material. Because of the endothermic nature of the decomposition reaction, the gaseous medium is cooled as it passes through the burden, and upon reaching the pellets has a temperature of about 1500–2000° F., which is ideally sufficient to carbonize and prereduce iron in the pellets. The burden is subjected to carbonizing for a period of 10–12 minutes. The hot gases are heated externally of the machine by burning combustible gases and also by igniting the gas after passing through the burden and recycling of such gases. The heat of the burden then results from the passage of the hot gases therethrough and from some oxidation of a portion of the carbonaceous material. The abundant quantity of gangue in the burden fuses at a relatively low temperature and causes slag or ceramic bonds to be formed. Thus, the pellets produced in accordance herewith are different from other iron ore pellets in that they are ceramically bonded and therefore, very hard and strong and able to withstand rough handling after the establishment of the ceramic bonds. In addition, a slight degree of carbon bonding takes place.

While it is not practical to use entirely inert gases in the gaseous medium traversing the burden on the grate, some inert gases could be used. However, from a practical standpoint, oxygen-depleted air wherein there are minor amounts of oxygen present, are used.

If the passage of such "inert" gases is continued for sufficient periods of time, the temperature of the burden may be raised to the incoming gas temperature at which temperature the reduction of the iron oxide is carried on to the extent of from about 10–90 percent of the available iron and the pellets are both metal and ceramic bonded.

By this method, substantial quantities of limestone can be introduced. Prior art has shown that introduction of large quantities of $CaCO_3$-containing material with the pellets intereferes with chemical beneficiation. By the method of this invention the $CaCO_3$ is not incorporated into the burden. By providing layers, the limestone becomes calcined and the ore of the "red mud" reduced, discharging from the traveling grate as a preheated, highly beneficiated burden.

While the process may be successfully practiced with just the downdraft operation, it has ben found that there is benefit in reversing the direction of the hot gases (not shown). By passing the gases through the burden of pellets in an opposite direction further down the path of travel, a uniform degree of reaction is insured for any particular level within the burden. The updraft reaction is conducted at about ambient temperature at a flow rate of 25–75 s.c.f.m./ft.$^2$ and the burden is subjected to the updraft for a period of 1 to 2 minutes. Following the change in direction of flow of draft, further reduction may be done in a zone immediately following the reversed gas zone.

In the methods described, any type of carbonaceous matter may be incoporated as the reducing agent. To produce a char-bond product, the reducing component should also include a tarry or asphalic material as the binder forming agent.

The pellets and limestone treated in accordance with this invention may be charged directly to a smelting furnace 28 or cooled and transferred to a remote smelting installation. The product resulting by the method of this invention is a carbonized and prereduced pellet and calcined limestone. The resulting pellets have an iron content of about 25–35 percent.

In a typical example, the following conditions and results indicated were noted and observed:

TABLE I

Charge data, processing conditions, and product quality of carbonized tests

Basis: 1 ft.$^2$ of grate area.

CHARGE DATA

Green pellets:
   Weight _____ 45 lbs. (83% red mud—17% coal dry basis).
   Moisture _____ 17–19%.
   Size _____ ⅝ +½".
   Depth _____ 6".
Oyster shells:
   Weight _____lbs__ 10
   Size _____ +¼"
   Depth _____ 2"

PROCESSING CONDITIONS

Drying:
   Temperature _____ 400–600° F.
   Time _____ 12–14 min.
   Flow rate _____ 250 s.c.m./ft.$^2$.
   Pressure _____ 3 in. $H_2O$.
Downdraft carbonizing:
   Temperature _____ 2000–2400° F.
   Time _____ 10–12 min.
   Flow rate _____ 100 s.c.f.m./ft.$^2$.
   Pressure _____ 1 in. $H_2O$.
Updraft carbonizing:
   Temperature _____ Ambient.
   Time _____ 1–2 min.
   Flow rate _____ 50 s.c.f.m./ft.$^2$.
   Pressure _____ 0.5 in. $H_2O$.

PRODUCT DATA

Chemistry—total burden—38.6 lbs.:

|  | Percent |
|---|---|
| Fe | 26–28 |
| C | 3–7 |
| $CO_2$ | 1–3 |
| Reduction | 55–65 |

What is claimed is:
1. A process for carrying out a gas-solid reaction between a circulating gas and a solid particulate burden and including the step of passing hot gaseous medium transversely to the direction of movement of solid particulate burden on a traveling grate, characterized by the steps of:
- (a) providing a first solid particulate layer comprising a pelletized residue resulting from the extraction of alumina from bauxite and is applied to the traveling grate about 5–10 inches deep;
- (b) superimposing on said first solid particulate burden a layer of a calcium carbonate-containing material superimposed on the first layer at a depth of about 1–4 inches;
- (c) traversing the second material (b) with incoming hot gases at a temperature of about 2000–2400° F. to release gases from the second material into the stream and to dilute the gas stream;
- (d) simultaneously adjusting the temperature of the incoming gases to a temperature not below that sufficient to cause coaction between the gases and the first material, and
- (e) passing the diluted gasses through the first material to effect a gas-solid reaction.

2. The process of claim 1, wherein the first layer of solid particulate material is formed by blending waste residue of alumina-depleted bauxite with a carbonaceous material.

3. The process of claim 2, wherein the waste residue of alumina-depleted bauxite is nodulized and dried and crushed prior to blending with the carbonaceous material.

4. The process of claim 2, wherein the carbonaceous material is ground prior to blending with the waste residue of alumina-depleted bauxite.

5. The process of claim 4, wherein the blend of waste residue and carbonaceous material is pelletized prior to effecting the gas-solid reaction.

6. The process of claim 5, wherein the pelletized waste residue and carbonaceous material undergoes gaseous drying at a temperature of about 400–600° F. for 10–15 minutes at a gas flow rate of about 200–300 s.c.f.m./ft.$^2$ prior to the gas-solid reaction.

7. The process of claim 6, wherein the gas-solid reaction is effected at an incoming downdraft gas temperature of from about 2000–2400° F. for from 10–15 minutes at from about 50–150 s.c.f.m./ft.$^2$.

8. The process of claim 7, wherein the gas-solid reaction is effected at an updraft gas temperature of about ambient temperature for about 0.5–3 minutes at a flow rate of about 25–75 s.c.f.m./ft.$^2$.

9. The process of claim 8, wherein the calcium carbonate-containing material comprises oyster shells.

References Cited
UNITED STATES PATENTS

| | | | |
|---|---|---|---|
| 2,238,103 | 4/1941 | Fink et al. | 75—1 X |
| 2,923,539 | 2/1960 | Meyer | 75—5 X |
| 2,964,383 | 12/1960 | Kamlet | 75—33 X |
| 3,028,218 | 4/1962 | Gregoire et al. | 75—1 X |
| 3,333,951 | 8/1967 | Ban | 75—5 X |

L. DEWAYNE RUTLEDGE, Primary Examiner

E. L. WEISE, Assistant Examiner

U.S. Cl. X.R.

75—33, 37